P. B. Holmes,
Furniture Caster.
Nº 50,249. Patented Oct. 3, 1865.
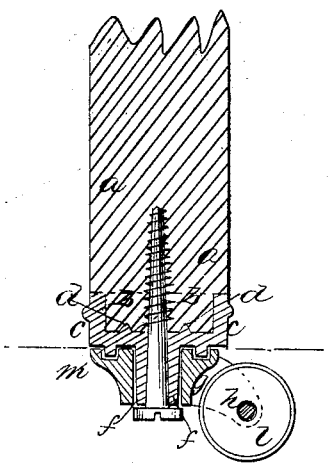
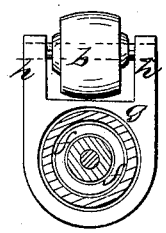
Fig. 2
Witnesses
Wm Breurn
Theo Lusch
Inventor
P B Holmes
By Munn &Co
Atty

UNITED STATES PATENT OFFICE.

P. B. HOLMES, OF NEW YORK, N. Y.

CASTER FOR FURNITURE.

Specification forming part of Letters Patent No. 50,249, dated October 3, 1865.

*To all whom it may concern:*

Be it known that I, P. B. HOLMES, of the city, county, and State of New York, have invented a new and useful Improvement in Casters for Furniture; and I do hereby declare that the following is a full, clear, and exact description thereof, which will enables others skilled in the art to make and use the same, reference being had to the accompanying drawings, forming part of this specification.

The present invention has for its object the formation and construction of a caster to be applied to the legs of a chair, sofa, bedstead, or other article of furniture in such a manner that the strength of the legs will not in the least degree be weakened thereby, while at the same time they will be securely held thereon, and the "horn," so called, of the caster in which the roller is hung be perfectly free to play round upon the legs, the advantages of which are apparent.

In the accompanying plate of drawings my improvement is illustrated, Figure 1 being a vertical section through a caster made according thereto, showing it applied to a chair-leg; Fig. 2, a horizontal section of the same, taken in the plane of the line $x\ x$, Fig. 1.

$a\ a$ in the drawings represent a portion of the leg of a chair, sofa, or other article of furniture, having applied to its lower end, $b$, a cap-plate, $c$, made of metal, either iron, brass, &c., entirely incasing the same, prongs of any suitable shape holding it in place. This plate $c$ has projecting from its under side, which may be either attached thereto or formed as a part thereof, a short hollow tube or shaft, $f$, around and upon which the horn $g$ of the caster plays, having in its outer end, $h$, a roller, $l$, hung in the ordinary manner so as to turn therein, a screw, $m$, being passed through the hollow tube $f$ and screwed into the leg for holding it and its plate in position, the head of such screw being of sufficient size as to project over and beyond the edges of the shaft, so as to prevent the horn from slipping off of the same.

From the above description it is plainly apparent that, by using the hollow shaft or bushing for the roller-horn of the caster to swing upon, the screw by which the caster is held upon the leg of the chair or other article to which it may be applied is relieved from all strain consequent therefrom, and that thereby a much freer play of the caster is obtained.

I claim as new and desire to secure by Letters Patent—

The combination, with the roller-horn of a caster, of the plate $c$, with its hollow shaft or bushing $f$ as a center or bearing for the horn to turn upon, substantially as herein described, and for the purpose specified.

The above specification of my invention signed by me this 7th day of August, 1865.

P. B. HOLMES.

Witnesses:
 M. M. LIVINGSTON,
 A. W. BROWN.